(12) United States Patent
Matsumoto et al.

(10) Patent No.: US 10,828,850 B2
(45) Date of Patent: Nov. 10, 2020

(54) FIBER-REINFORCED PLASTIC AND METHOD OF PRODUCING THE FIBER-REINFORCED PLASTIC

(71) Applicant: SUBARU CORPORATION, Tokyo (JP)

(72) Inventors: Shota Matsumoto, Tokyo (JP); Kosuke Kawai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/160,705

(22) Filed: Oct. 15, 2018

(65) Prior Publication Data

US 2019/0168468 A1  Jun. 6, 2019

(30) Foreign Application Priority Data

Dec. 4, 2017  (JP) .................................. 2017-232317

(51) Int. Cl.
| | | |
|---|---|---|
| *B29C 70/48* | (2006.01) | |
| *B29C 70/68* | (2006.01) | |
| *B29C 70/78* | (2006.01) | |
| *B29K 105/08* | (2006.01) | |
| *B32B 3/30* | (2006.01) | |
| *B32B 5/02* | (2006.01) | |

(Continued)

(52) U.S. Cl.
CPC ............ *B29C 70/48* (2013.01); *B29C 70/682* (2013.01); *B29C 70/78* (2013.01); *B29K 2105/0845* (2013.01); *B32B 3/266* (2013.01); *B32B 3/30* (2013.01); *B32B 5/024* (2013.01); *B32B 27/12* (2013.01)

(58) Field of Classification Search
CPC ................................ B29C 70/48; B29C 45/14
See application file for complete search history.

(56) References Cited

U.S. PATENT DOCUMENTS

| | | | | | |
|---|---|---|---|---|---|
| 5,824,246 | A | * | 10/1998 | Reetz | ..................... B27N 3/086 264/122 |
| 6,478,926 | B1 | * | 11/2002 | Brachos | ................ B29C 70/342 156/379.8 |

(Continued)

FOREIGN PATENT DOCUMENTS

| | | |
|---|---|---|
| JP | S54-120691 A | 9/1979 |
| JP | H 08-156116 A | 6/1996 |

(Continued)

OTHER PUBLICATIONS

Japanese Office Action, dated Nov. 5, 2019, in Japanese Application No. 2017-232317 and English Translation thereof.

*Primary Examiner* — Matthew J Daniels
*Assistant Examiner* — Andrew D Graham
(74) *Attorney, Agent, or Firm* — McGinn I. P. Law Group, PLLC.

(57) ABSTRACT

A method of producing a fiber-reinforced plastic includes disposing a transparent film as an outermost layer on a lower die of a molding die, disposing a base sheet formed of a fiber fabric on the transparent film, closing the molding die with an upper die, and injecting a matrix resin into the molding die closed. The transparent film has grooves on a surface facing the base sheet. In the disposing, the base sheet is disposed such that the grooves are located between adjacent weaving gaps of the base sheet.

17 Claims, 7 Drawing Sheets

(51) Int. Cl.
*B32B 27/12* (2006.01)
*B32B 3/26* (2006.01)

(56) References Cited

U.S. PATENT DOCUMENTS

| | | | | |
|---|---|---|---|---|
| 7,037,865 | B1 * | 5/2006 | Kimberly | B29C 70/60 264/103 |
| 8,741,198 | B2 * | 6/2014 | Sekido | B29C 70/48 264/258 |
| 2001/0041239 | A1 * | 11/2001 | Palmqvist | B29C 70/46 428/46 |
| 2002/0113340 | A1 * | 8/2002 | Reetz | B27N 3/00 264/320 |
| 2004/0000745 | A1 * | 1/2004 | Channer | B29C 70/443 264/511 |
| 2004/0017020 | A1 * | 1/2004 | Loving | B29C 70/443 264/134 |
| 2004/0265593 | A1 * | 12/2004 | Kamijo | B29C 55/00 428/411.1 |
| 2006/0001183 | A1 * | 1/2006 | Nguyen | B29C 70/72 264/1.7 |
| 2008/0206541 | A1 * | 8/2008 | Medoff | D21C 9/007 428/292.1 |
| 2009/0047854 | A1 * | 2/2009 | Bleeker | B29C 45/14631 442/286 |
| 2010/0113627 | A1 * | 5/2010 | Matsumoto | C08J 9/32 521/59 |
| 2011/0143110 | A1 * | 6/2011 | Tsuchiya | C08J 5/24 428/213 |
| 2012/0001364 | A1 * | 1/2012 | Shin | B29C 45/14827 264/275 |
| 2013/0052899 | A1 * | 2/2013 | Li | B32B 5/024 442/59 |
| 2013/0108823 | A1 * | 5/2013 | Beraud | B29C 70/086 428/107 |
| 2013/0122244 | A1 * | 5/2013 | Patel | B29C 44/146 428/116 |
| 2013/0196138 | A1 * | 8/2013 | Fusco | B29C 35/10 428/300.7 |
| 2016/0347010 | A1 * | 12/2016 | Nurnberg | A63B 41/08 |
| 2017/0106610 | A1 * | 4/2017 | Manera | B29C 70/345 |
| 2017/0157804 | A1 | 6/2017 | Takemoto et al. | |
| 2017/0239895 | A1 * | 8/2017 | Takehara | B29C 70/086 |
| 2018/0200714 | A1 * | 7/2018 | Viovy | F16L 11/085 |
| 2019/0054706 | A1 * | 2/2019 | Takehara | B29C 43/18 |

FOREIGN PATENT DOCUMENTS

| | | |
|---|---|---|
| JP | 2005-153176 A | 6/2005 |
| JP | 2006-230625 A | 9/2006 |
| JP | 2006-305867 A | 11/2006 |
| JP | 2009-090646 A | 4/2009 |
| JP | 2015-003939 A | 1/2015 |
| WO | WO 2015/107903 A1 | 7/2015 |

\* cited by examiner

FIBER-REINFORCED PLASTIC AND METHOD OF PRODUCING THE FIBER-REINFORCED PLASTIC

CROSS-REFERENCE TO RELATED APPLICATIONS

The present application claims priority from Japanese Patent Application No. 2017-232317 filed on Dec. 4, 2017, the entire contents of which are hereby incorporated by reference.

BACKGROUND

1. Technical Field

The present invention relates to a fiber-reinforced plastic including a transparent film and a base sheet formed of a fiber fabric and a method of producing the fiber fabric.

2. Related Art

Fiber-reinforced plastics (FRP) including resin and a fibrous material such as a carbon fiber mixed in the resin are used in various industries, such as automotive and aerospace industries. The fiber-reinforced plastic is usable as a weight saving component due to its light weight and high strength. In particular, there is an increasing demand for a fiber-reinforced plastic including a fiber fabric, e.g., a carbon fiber fabric, as the fibrous material because the woven texture of the carbon fiber fabric has good appearance when seen from the front side.

Japanese Unexamined Patent Application Publication (JP-A) No. 8-156116 describes a method of producing a fiber-reinforced plastic. In the method, a film sheet is disposed on a lower die of a molding die and a fiber fabric sheet is disposed on the film sheet. Then, the molding die is closed with an upper die, and a matrix resin is injected into the molding die and cured.

The film sheet disposed as the outermost layer in the molding eliminates an additional step of applying protective gelcoat onto a front surface after the molding and provides higher protection against the front surface while retaining good appearance.

SUMMARY OF THE INVENTION

A method of producing a fiber-reinforced plastic according to an aspect of the present invention includes disposing a transparent film as an outermost layer on a lower die of a molding die and disposing a base sheet formed of a fiber fabric on the transparent film, and closing the molding die with an upper die and injecting a matrix resin into the molding die closed. The transparent film has grooves on a surface facing the base sheet. In the disposing, the base sheet is disposed such that the grooves is located between adjacent weaving gaps of the base sheet.

DETAILED DESCRIPTION

In general, a molded fiber-reinforced plastic including a fiber fabric has a difference in level along weaving gaps on its surface. Such difference is formed by the surface unevenness due to the weaving gaps in the fiber fabric and the shrinkage of the matrix resin in the weaving gaps. Specifically described, since the thickness of the matrix resin is large at the weaving gaps where the surface is recessed, recesses are formed at the weaving gaps when the matrix resin is cured and shrinks.

Since the film sheet and the fiber fabric sheet are integrally molded in JP-A No. 8-156116, when the matrix resin shrinks, the film sheet on the matrix resin is pulled. Thus, the film sheet has unevenness on its surface.

The surface of the molded article needs to be made smooth to improve the external appearance of the molded article. This requires the molded fiber-reinforced plastic to be polished after a filling agent is applied to the surface or to be coated with multiple layers of clear coating.

However, the polishing process and the coating process consume time and cost. There is a demand for a method in which less unevenness is generated on the surface during the molding process, and productivity increases, which leads to a reduction in the cost.

In view of the above-described problems, it is desirable to provide a fiber-reinforced plastic having a surface with less unevenness to achieve higher productivity, and a method of producing the same.

Figure 1:
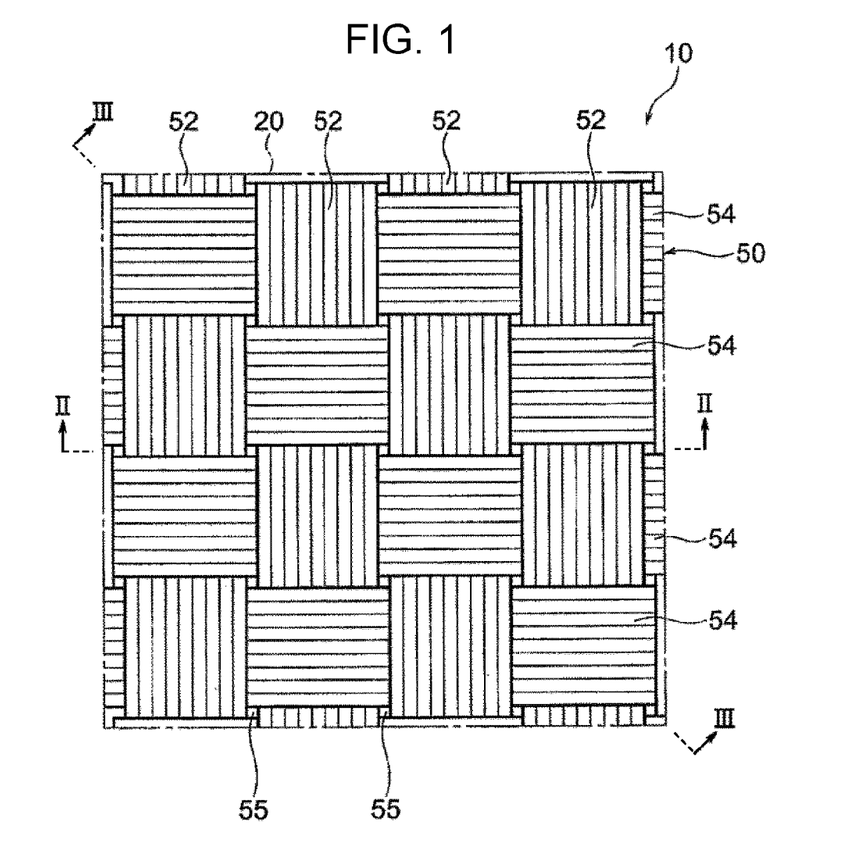
FIG. 1 is a plan view schematically illustrating a front surface of a fiber-reinforced plastic according to an example of the present invention.
Figure 2:
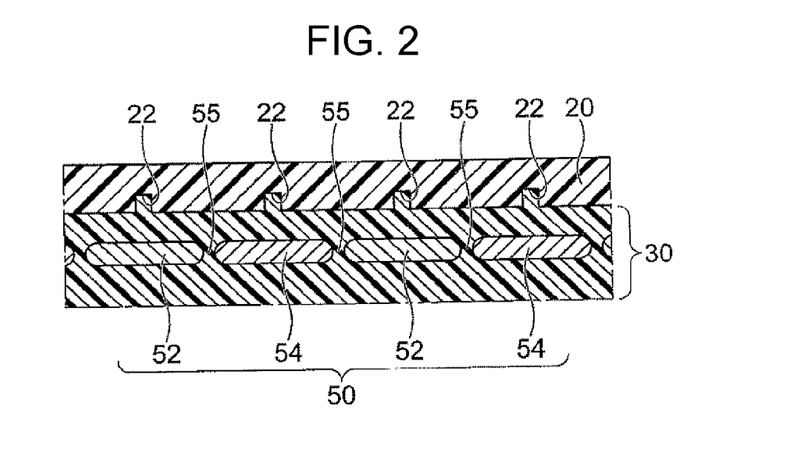
FIG. 2 is a sectional view taken along line II-II in FIG. 1.
Figure 3:
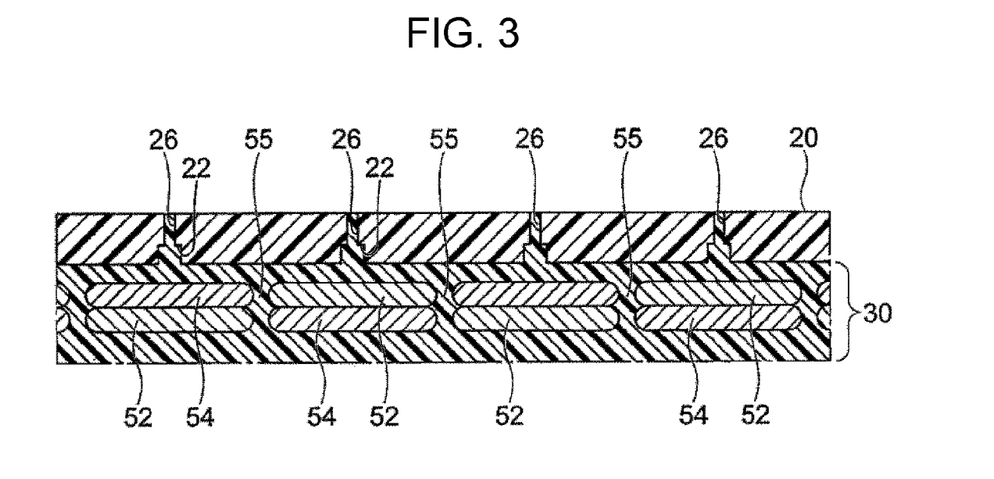
FIG. 3 is a sectional view taken along line III-III in FIG. 1.

FIG. 1 is a plan view schematically illustrating a surface of a fiber-reinforced plastic 10 according to an example of the invention. FIG. 2 is a schematic sectional view taken along line II-II in FIG. 1. FIG. 3 is a schematic sectional view taken along line III-III in FIG. 1.

The fiber-reinforced plastic 10 includes a transparent film 20 as an outermost layer and a fiber-reinforced plastic layer 30 adjoining the transparent film 20. The transparent film 20 has multiple grooves 22 on an inner surface facing the fiber-reinforced plastic layer 30. The fiber-reinforced plastic layer 30 is formed of a laminate including at least one fibrous sheet impregnated with a matrix resin 40. The matrix resin 40 is cured to form the fiber-reinforced plastic layer 30. The fiber-reinforced plastic layer 30 includes a base sheet 50 formed of a fiber fabric at least on a surface facing the transparent film 20.

A reinforcement fiber included in the fiber-reinforced plastic layer 30 may be a carbon fiber or a glass fiber, for example. The carbon fiber is preferably employed due to its light weight, high strength, and high rigidity. In this example, the base sheet 50 is a plain-woven fiber fabric including warp threads 52 and weft threads 54 each formed of a fiber bundle of carbon fibers. The base sheet 50 is not limited to the plain-woven fiber fabric and may be, for example, twill fiber fabric or satin fiber fabric. As illustrated in FIG. 1 to FIG. 3, the base sheet 50 has weaving gaps 55 (gaps between the warp threads 52 and the weft threads 54).

In this example, although the fiber-reinforced plastic layer 30 is a laminate including multiple fibrous sheets and the base sheet 50 as an outer most layer, only the base sheet 50 is illustrated in the drawings and the other fibrous sheets are not illustrated. The fibrous sheet included in the base sheet 50 is not limited to a woven fabric. The fibrous sheet may be, for example, a unidirectional material including unidirectionally oriented fibers, a knit fabric, a non-woven fabric, or the like.

The matrix resin 40 included in the fiber-reinforced plastic layer 30 may appropriately be any one of a thermoplastic resin and a thermosetting resin. Examples of the thermosetting resin include an epoxy resin, an unsaturated polyester resin, a phenolic resin, and a polyurethane resin. Examples of the thermoplastic resin include a polyethylene resin, a polypropylene resin, a poly vinyl chloride resin, an ABS resin, a polystyrene resin, an AS resin, a polyamide resin such as nylon 6 and nylon 66, a polyacetal resin, a polycarbonate resin, a thermoplastic polyester resin, a polyphenylene sulfide (PPS) resin, a fluorine resin, a polyether imide resin, a polyether ketone resin, and a polyimide resin. The thermoplastic resins may be used alone or in combination of two or more kinds thereof.

Figure 4:
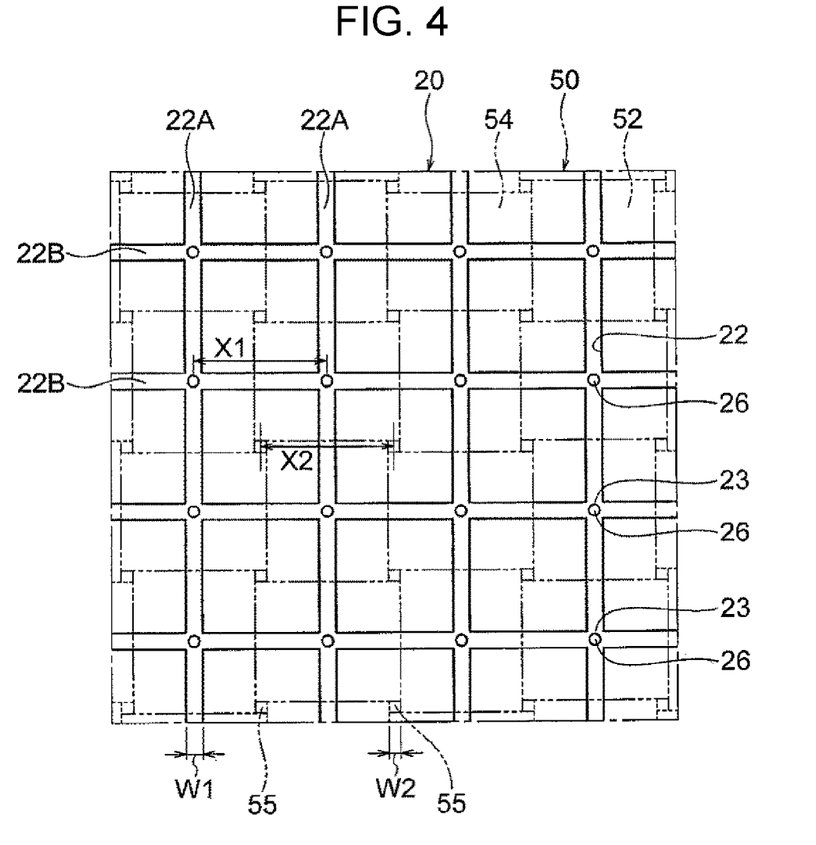
FIG. 4 is a plan view illustrating an inner surface of a transparent film.

FIG. 4 is a plan view illustrating an inner surface of the transparent film 20. In FIG. 4, the warp threads 52 and the weft threads 54 of the base sheet 50 are indicated by imaginary lines for ease of understanding how the transparent film 20 is disposed on the base sheet 50, that is, positional relationships between the weaving gaps 55 and the grooves 22 and through holes 26 of the transparent film 22 in the laminated state.

The transparent film 20 may be formed of any one of a thermoplastic resin and a thermosetting resin. The thermoplastic resin is preferably employed since the transparent film 20 is integrally molded with the fiber-reinforced plastic layer 30. Examples of the thermoplastic resin include an acrylic resin, a polycarbonate resin, and a polyethylene terephthalate resin. The transparent film 20 has the grooves 22 on the inner surface facing the fiber-reinforced plastic layer 30 and has no grooves 22 on the outer surface.

The grooves 22 include multiple vertical grooves 22A extending continuously in the vertical direction in a straight line and multiple horizontal grooves 22B extending continuously in the horizontal direction in a straight line. The grooves 22 form a substantially square grid as a whole. As illustrated in FIG. 4, the width X1 of the grid between the adjacent grooves 22 is substantially equal to the width X2 between the adjacent weaving gaps 55 of the base sheet 50. The width X2 is suitably set by a weaving yarn and may be in a range of 2 mm to 1.5 cm, for example. The grid pattern formed by the grooves 22 and a grid-like pattern (see the imaginary lines in FIG. 4) formed by the weaving yarns at the both ends of the warp threads 52 and the weft threads 54 are displaced from each other in the vertical direction and the horizontal direction such that at least one of the grooves 22 is present between the weaving gaps 55 adjacent to each other in the vertical direction and the horizontal direction.

In this example, the width W1 of the vertical grooves 22A and the horizontal grooves 22B is substantially equal to the width W2 of the weaving gaps 55. The width W1 and the width W2 may be suitably set. For example, the width W1 of the groove 22 may be larger or smaller than the width W2 of the weaving gap 55.

The thickness of the base sheet 50 or the fibrous sheet laminate including the base sheet 50 is 0.5 mm or more, for example. The thickness of the transparent film 20 (the thickness of the portion not having the grooves 22) is in a range of 0.2 mm to 0.5 mm, for example.

As illustrated in FIG. 3 and FIG. 4, the transparent film 20 has many fine through holes 26. The matrix resin 40 is present in the through holes 26. The through holes 26 are preferably positioned away from the weaving gaps 55. In this example, the through holes 26 are located at respective intersections 23 of the vertical grooves 22A and the horizontal grooves 22B. The diameter of the through holes 26 is preferably substantially equal to or smaller than the width W1 of the grooves 22.

Figure 5:
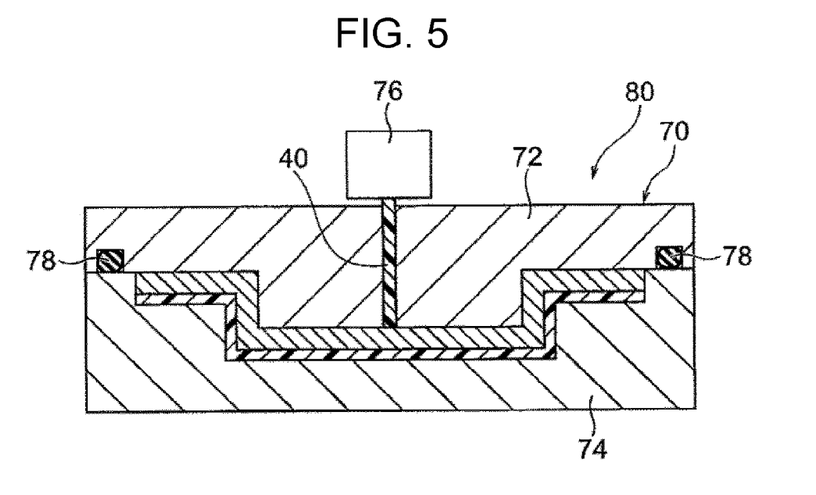
FIG. 5 is a schematic sectional view of a production apparatus and schematically illustrates a step of molding the fiber-reinforced plastic.

The above-described fiber-reinforced plastic 10 is produced by using a die 70 which is a known die usable in a resin transfer molding (RTM) process, for example. FIG. 5 is a view schematically illustrating a production apparatus 80 including the die 70 for forming the fiber-reinforced plastic 10. The die 70 includes an upper die 72 and a lower die 74 and is attached to a pressing machine (not illustrated). The upper die 72, which is a movable die, is moved up or down by a lifting mechanism of the pressing machine toward or away from the lower die 74, which is a stationary die. When the upper die 72 is positioned close to the lower die 74, the die 70 is closed and a cavity (an internal space in the molding die) is formed in the die 70. The cavity has an uneven shape corresponding to the shape of the fiber-reinforced plastic 10 to be molded. An injector 76 for injecting the matrix resin 40 into the cavity is attached to the upper die 72.

Next, a method of producing the fiber-reinforced plastic 10 is described with reference to FIG. 5 and FIGS. 6A and 6B.

Figure 6A:
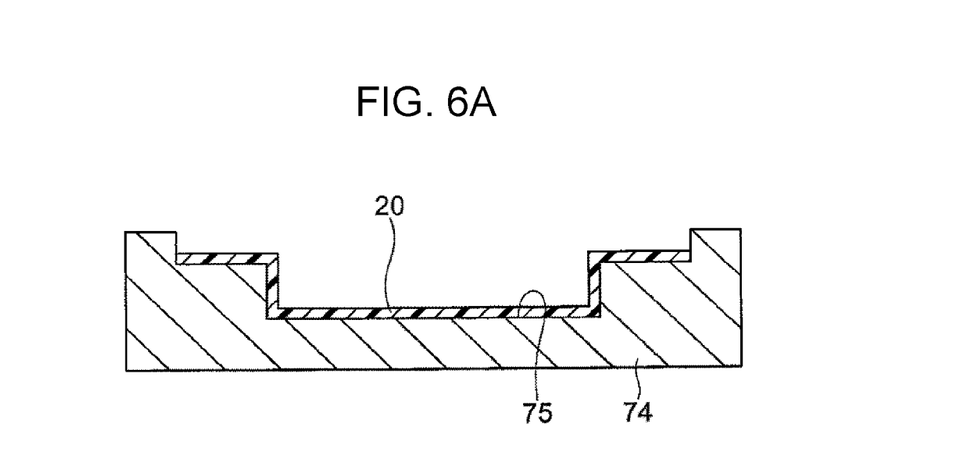
FIGS. 6A and 6B are schematic sectional views schematically illustrating steps of molding the fiber-reinforced plastic.

As illustrated in FIG. 6A, with the upper die 72 being away from the lower die 74, the transparent film 20 is disposed on a cavity formation surface 75 of the lower die 74 with the surface having the grooves 22 facing the cavity.

Figure 6B:
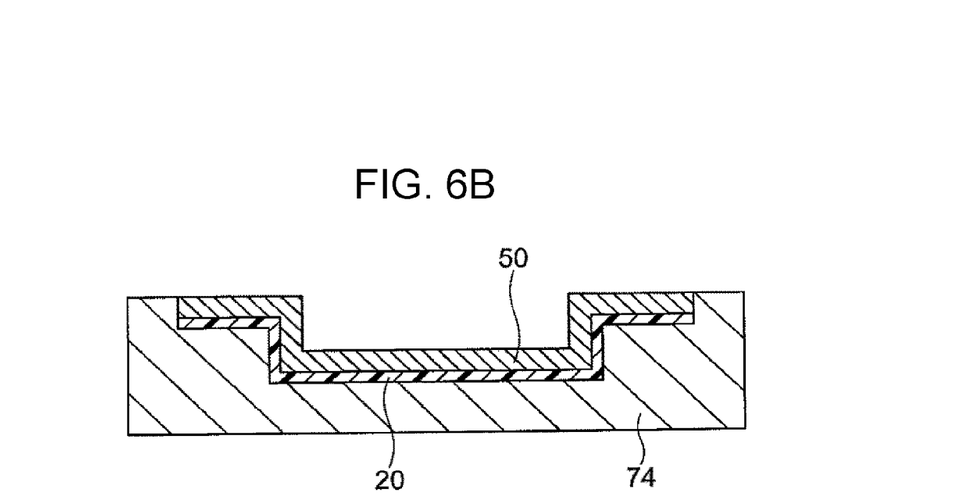

Next, as illustrated in FIG. 6B, the base sheet 50 is disposed on the transparent film 20 (a disposing step). When the fiber-reinforced plastic layer 30 is composed of a laminate of fibrous sheets including the base sheet 50, the laminate of the fibrous sheets is disposed such that the base sheet 50 is disposed on the transparent film 20. The base sheet 50 is disposed such that the grooves 22 of the transparent film 20 are located between adjacent weaving gaps 55. Furthermore, the base sheet 50 is positioned such that the weaving gaps 55 thereof do not overlap the through holes 26 of the transparent film 20.

The base sheet 50 or the laminate of fibrous sheets may be or may not be preliminary shaped into the shape of the molded article. The laminate of fibrous sheets may be prepreg including multiple fibrous sheets bonded to each other with an adhesive formed of a thermosetting resin or a thermoplastic resin.

After the transparent film 20 and the base sheet 50 are disposed on the lower die 74, the upper die 72 is moved close to the lower die 74 to close the die 70. The cavity is sealed with a sealing member 78 in the die 70. In the closed state illustrated in FIG. 5, the die 70 is evacuated by a vacuum device (not illustrated), and then, the matrix resin 40 is injected by the injector 76 into the cavity to impregnate the fibrous sheet with the matrix resin 40 (a resin injecting step). In this example, the matrix resin 40 is a thermoplastic resin having melting point and viscosity lower than the thermoplastic resin forming the transparent film 20. In the injection of the matrix resin 40, the inside of the die 70 is heated at a temperature equal to or higher than the melting point of the matrix resin 40 and lower than the melting point of the transparent film 20.

The injected matrix resin 40 enters the grooves 22 and the through holes 26 of the transparent film 20. This accelerates deaeration of the matrix resin 40 through the grooves 22 or the through holes 26.

Subsequently, the matrix resin 40 is cured and the die 70 is opened so that the molded fiber-reinforced plastic 10 is taken out.

When the matrix resin 40 is cured, a larger cohesive force is generated in the matrix resin 40 at a thick portion than at a thin portion, which causes the matrix resin 40 at the thick portion to shrink a lot in the thickness direction. Thus, the thick portion is recessed as compared to the thin portion and provides an uneven surface as a whole.

Figure 11:
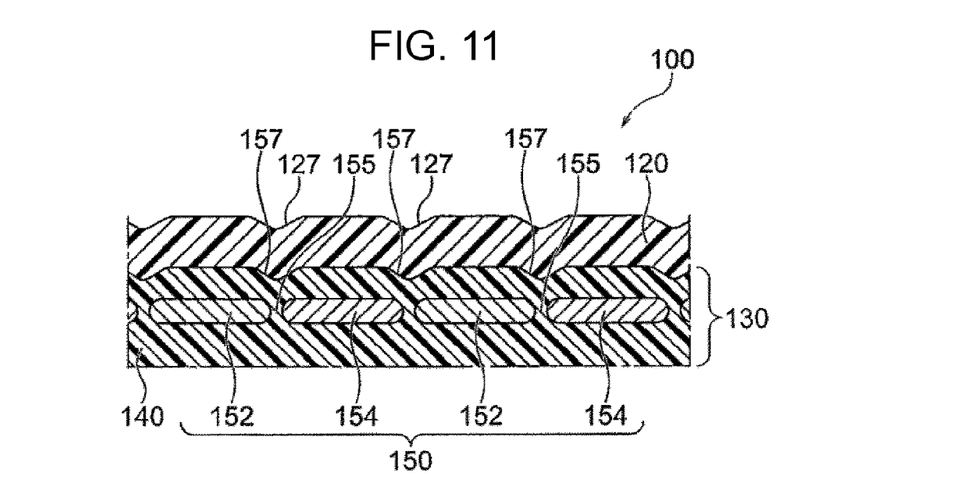
FIG. 11 is a sectional view illustrating a fiber-reinforced plastic of the related art similarly to FIG. 2.

As illustrated in FIG. 11, in a fiber-reinforced plastic 100 of the related art including a transparent film 120 not having grooves and through holes, a fiber-reinforced plastic layer 130 has large recesses (sink marks) 157 due to curing and shrinkage of the matrix resin 140 at weaving gaps 155 formed by warp threads 152 and weft threads 154 of the base sheet 150. In other words, the matrix resin 140 on the front side is thinner at the protrusions of the unevenness of the base sheet 150, which is a fabric, and the matrix resin 140 is thicker at the recesses of the base sheet (portions corresponding to the weaving gaps 155). Thus, when the matrix resin 140 is cured and shrinks, the portions where the matrix resin 140 is thicker are recessed as compared to the portions where the matrix resin 140 is thinner. The transparent film 120 on the front side is pulled due to the shrinkage, which forms recesses 127 on the front surface of the fiber-reinforced plastic 100. Thus, the fiber-reinforced plastic 100 has uneven surface.

As illustrated in FIG. 2, the fiber-reinforced plastic 10 of this example includes, in addition to the weaving gaps 55, the grooves 22 and the through holes 26 of the transparent film 20 at the protrusions of the base sheet 50 where the matrix resin 40 is thin in the configuration of the related art. This configuration enables the matrix resin 40 at the protrusions of the base sheet 50 to have a large thickness. The cohesive force of the matrix resin 40 filling the weaving gaps 55 is dispersed by the cohesive force of the matrix resin 40 filling the grooves 22 and/or the through holes 26. The tensile force acting on the surface of the transparent film 20 due to the shrinkage of the matrix resin 40 is smaller than that in the configuration of the related art. Thus, the recesses on the outer surface of the transparent film 20 have a smaller depth and are finer than those in the configuration of the related art, which enables the outer surface of the transparent film 20 to be smooth and flat as a whole.

Furthermore, since the matrix resin 40 filling the through holes 26 exists on the surface of the fiber-reinforced plastic 10, the internal stress is able to be released. This configuration forms a smoother surface compared with a configuration having only the grooves 22. Furthermore, the columnar matrix resin 40 filling the through holes 26 supports the transparent film 20, thereby reducing the unevenness of the surface.

As described above, in the molding process, the fiber-reinforced plastic 10 is made to have a planar surface smoother than that in the configuration of the related art. This eliminates a surface polishing process or reduces the number of coating processes, which are performed after the molding process in the configuration of the related art. This reduces the production cost and improves productivity.

Furthermore, in the above-described fiber-reinforced plastic 10, deaeration of the matrix resin 40 is accelerated through the grooves 22 or the through holes 26 when the matrix resin 40 is injected. This improves the quality of the fiber-reinforced plastic 10. In particular, since the through holes 26 are located at the intersections 23 of the grooves 22 where the matrix resin 40 is likely to concentrate, efficient deaeration of the matrix resin 40 is enabled.

Furthermore, since the matrix resin 40 is formed of a thermoplastic resin having a lower melting point and a lower viscosity than the transparent film 20, the transparent film 20 is not melt during the molding process.

Next, modifications of the transparent film 20 of the fiber-reinforced plastic 10 are described with reference to FIG. 7 to FIG. 10. In FIG. 7 to FIG. 10, components similar to those in the example are assigned the same reference numerals as those in the example and are not described in detail.

Modification 1

Figure 7:
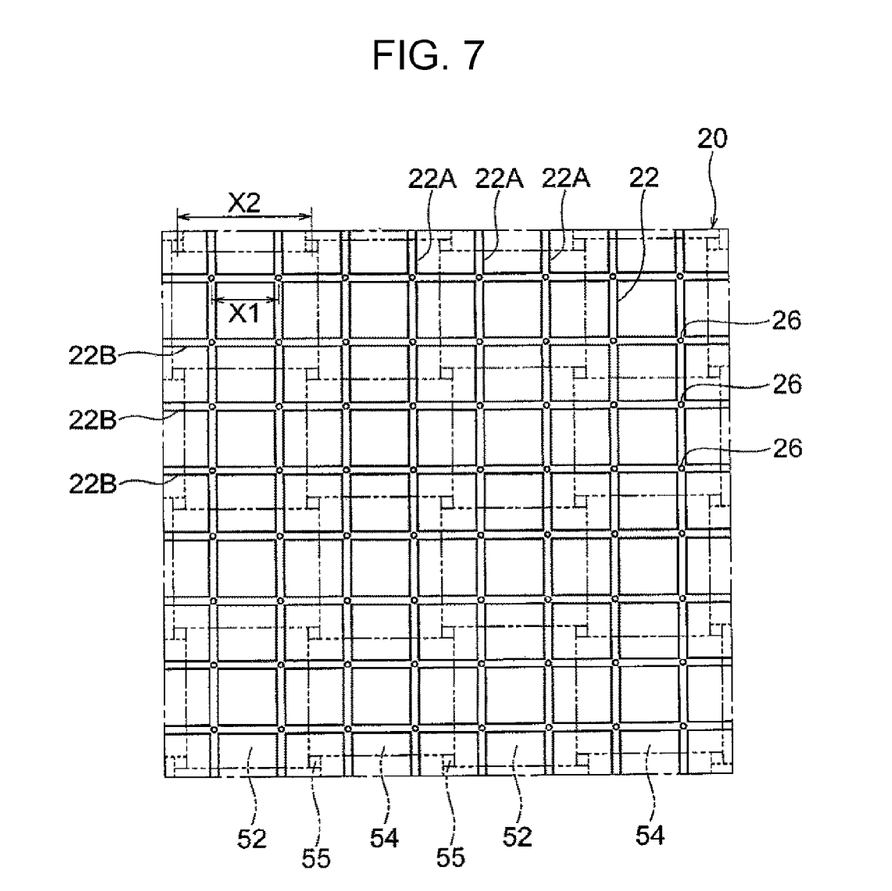
FIG. 7 is a plan view illustrating Modification 1 of the transparent film similarly to FIG. 4.

In Modification 1 illustrated in FIG. 7, the width X1 of the grid between the adjacent grooves 22 is smaller than the width X2 between the adjacent weaving gaps of the base sheet 50. This configuration in which the width X1 of the grid between the adjacent grooves 22 is smaller than the width X2 of the adjacent weaving gaps allows at least one of the grooves 22 to be reliably positioned between the adjacent weaving gaps 55. In FIG. 7, all the grooves 22 do not overlap the weaving gaps 55, but some of the grooves 22 may overlap the weaving gaps 55. In the direction along the warp threads 52 (or the weft threads 54), the number of the horizontal grooves 22B (or the vertical grooves 22A) per unit length is preferably twice or more as large as the number of the weaving gaps.

Modification 2

Figure 8:
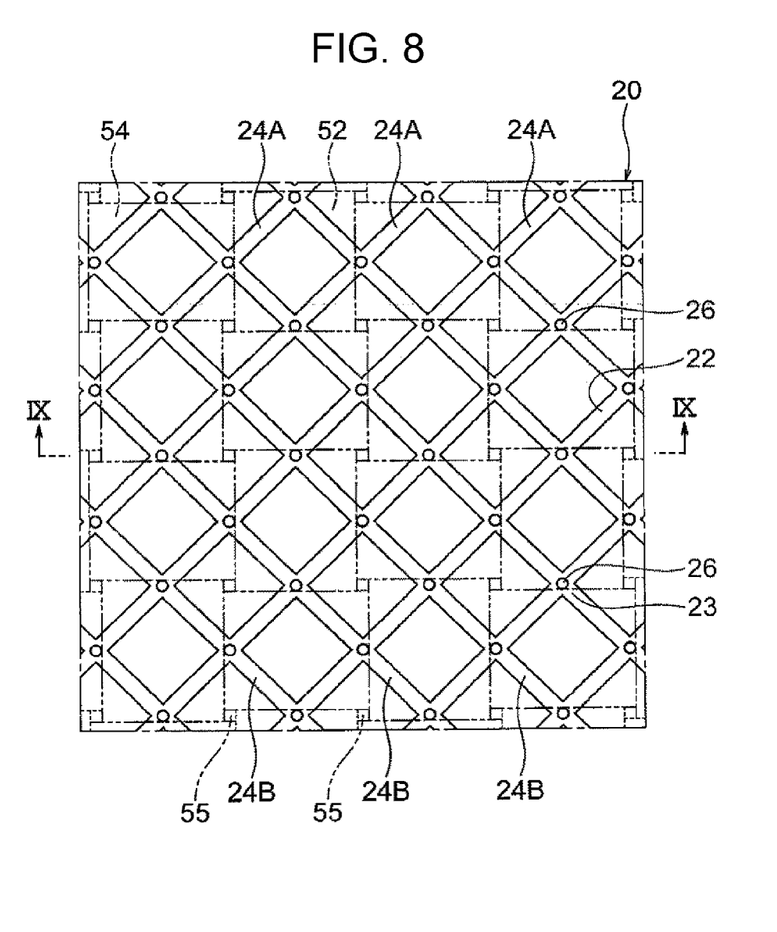
FIG. 8 is a plan view illustrating Modification 2 of the transparent film similarly to FIG. 4.
Figure 9:
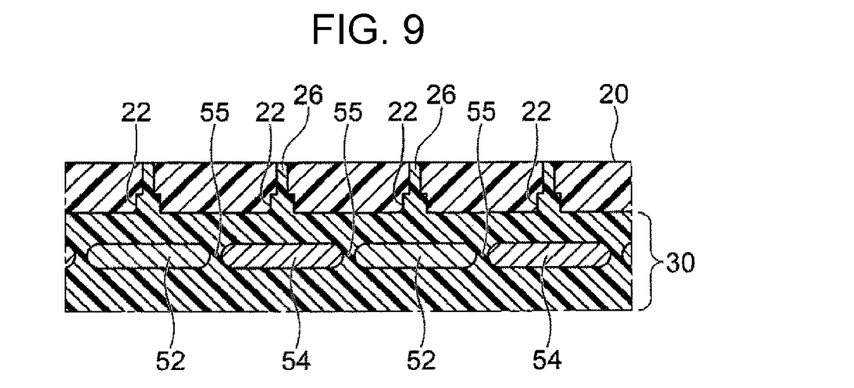
FIG. 9 is a sectional view illustrating Modification 2 of the transparent film similarly to FIG. 2.

In Modification 2 illustrated in FIG. 8 and FIG. 9, the grooves 22 extend in two directions different from directions in which the warp threads 52 and weft threads 54 extend. Specifically described, the grooves 22 include first grooves 24A extending in a first direction intersecting with the vertical direction and the horizontal direction and second grooves 24B extending in a second direction perpendicular to the first direction. In the illustrated example, the first grooves 24A and the second grooves 24B are inclined in the vertical direction and the horizontal direction at an angle of about 45°. The intersections 23 of the grooves 22 are positioned between the weaving gaps 55 adjacent to each other in the vertical direction and the horizontal direction.

Modification 3

Figure 10:
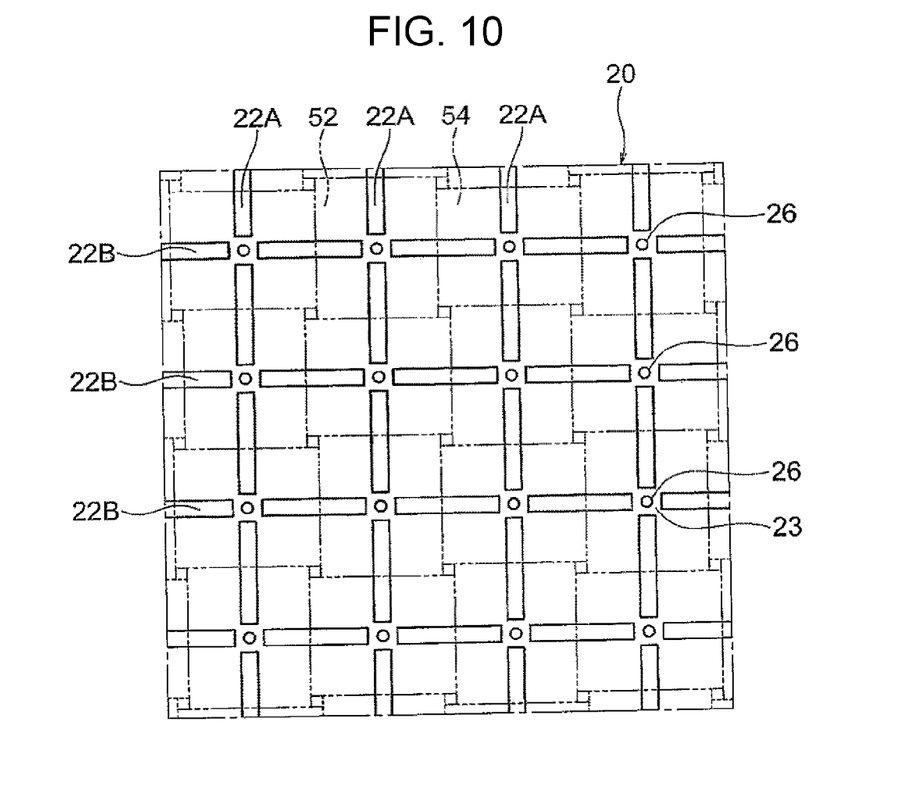
FIG. 10 is a plan view illustrating Modification 3 of the transparent film similarly to FIG. 4.

In Modification 3 illustrated in FIG. 10, the grooves 22 in a grid-like shape are discontinuous at the intersections 23. The through holes 26 are located at the discontinuous portions. The grooves 22 may extend in a discontinuous manner in two directions as in Modification 2. The discontinuous straight grooves 22 allow the matrix resin 40 to readily flow in the extending directions of the grooves 22 and enable adjustment of the amount of the matrix resin 40 flowing into the grooves 22.

The present invention is not limited to the above-described example and modifications and may be modified without departing from the gist of the present invention. For example, the transparent film 22 may dispense with the through holes 26.

Furthermore, the shape formed by the grooves 22 of the transparent film 20 is not limited to the grid-like shape and may be any shape that enables at least one of the grooves 22 to be positioned between adjacent weaving gaps 55.

Furthermore, the positions of the through holes 26 of the transparent film 20 are not limited to the intersections 23 of the grooves 22. For example, the through holes 26 may be positioned only in an area not having the grooves 22 or both in areas having the grooves 22 and not having the grooves 22.

According to the example and the modifications, the grooves in the transparent film are positioned between adjacent weaving gaps of the base sheet. In this configuration, when the matrix resin is injected, the thickness of the matrix resin is large at the weaving gaps of the base sheet and at the grooves in the transparent film positioned between the weaving gaps. Since the thickness is also large at the portion between the weaving gaps, the protrusions and recesses of the surface, which are generated when the matrix resin is cured and shrinks, are fine. Thus, the overall surface is smooth with less unevenness. As described above, the unevenness of the surface of the fiber-reinforced plastic generated in the molding process is reduced by the above-described configuration applied to the transparent film to be integrally molded. This eliminates the polishing process and reduces the number of coating processes, which are performed after the molding process, leading to a reduction in the production cost and improvement in productivity.

According to the example and the modifications, the bubbles in the matrix resin are removed through the through holes in the transparent film during the molding process of the fiber-reinforced plastic, thereby reducing generation of bubbles in the molding process. Furthermore, the cohesive force generated at the weaving gaps of the base sheet when the matrix resin is cured is dispersed by the cohesive force of the matrix resin in the grooves and the through holes of the transparent film, thereby reducing the surface unevenness.

According to the example and the modifications, the grooves in the transparent film form a grid-like shape, which allows the matrix resin to readily flow along the grooves. In addition, this configuration allows the grooves in the transparent film to be readily positioned between the weaving gaps of the base sheet.

According to the example and the modification, in the grid-shaped grooves, the through holes are positioned at the intersections of the grooves where the matrix resin is likely to concentrate. This configuration allows the bubbles in the matrix resin to efficiently escape through the through holes in the transparent film.

According to the example and the modifications, the grooves in the transparent film are positioned between adjacent weaving gaps of the base sheet. In the transparent film and the fiber-reinforced plastic layer that are integrally molded, the thickness of the matrix resin is large at the weaving gaps of the base sheet and at the grooves in the transparent film positioned between the weaving gaps. This makes the protrusions and recesses of the surface, which are generated when the matrix resin is cured and shrinks, fine. Thus, the overall surface is smooth with less unevenness. As described above, the unevenness of the surface of the fiber-reinforced plastic generated in the molding process is reduced by employment of the above-described configuration applied to the transparent film to be integrally molded. This eliminates the polishing process and reduces the number of coating processes, which are performed after the molding process, leading to a reduction in the production cost and improvement in productivity.

The invention claimed is:

1. A method of producing a fiber-reinforced plastic, the method comprising:
    disposing a transparent film in a molding die;
    disposing a base sheet including a fiber fabric on the transparent film; and
    injecting a matrix resin into the molding die,
    wherein the fiber fabric includes first threads that are positioned substantially parallel to each other, second threads that intersect with the first threads, and weaving gaps that include gaps formed among the first threads and the second threads,
    wherein the weaving gaps include adjacent weaving gaps that are adjacent to each other,
    wherein the transparent film includes grooves on a surface facing the base sheet,
    wherein, in the disposing, in a plan view, the base sheet and the transparent sheet are positioned such that the grooves are sandwiched between the adjacent weaving gaps, and
    wherein widths of the grooves are less than widths of the first threads.

2. The method of producing a fiber-reinforced plastic according to claim 1, wherein the transparent film includes a number of fine through holes in a front surface.

3. The method of producing a fiber-reinforced plastic according to claim 1, wherein the grooves on the transparent film form a grid, and a width of the grid between adjacent grooves is substantially equal to or smaller than a width between the adjacent weaving gaps of the base sheet.

4. The method of producing a fiber-reinforced plastic according to claim 2, wherein the grooves on the transparent film form a grid and a width of the grid between adjacent grooves is substantially equal to or smaller than a width between the adjacent weaving gaps of the base sheet.

5. The method of producing a fiber-reinforced plastic according to claim 1, wherein the transparent film includes a through hole at an intersection of the grooves forming a grid.

6. The method of producing a fiber-reinforced plastic according to claim 2, wherein a through hole of the through holes is located at an intersection of the grooves forming a grid.

7. The method of producing a fiber-reinforced plastic according to claim 3, wherein the transparent film includes a through hole at an intersection of the grooves forming the grid.

8. A fiber-reinforced plastic, comprising:
    a fiber-reinforced plastic layer that comprises a base sheet formed of a fiber fabric as a front layer and is impregnated with a matrix resin; and
    a transparent film as an outermost layer that covers the front layer of the fiber-reinforced plastic layer and is integrally molded with the fiber-reinforced plastic layer,
    wherein the fiber fabric includes first threads that are positioned substantially parallel to each other, second threads that intersect with the first threads, and weaving gaps that include gaps formed among the first threads and the second threads,
    wherein the weaving gaps include adjacent weaving gaps that are adjacent to other,
    wherein the transparent film include grooves on a surface facing the base sheet,
    wherein, in a plan view, the grooves are sandwiched between adjacent weaving gaps of the base sheet and the matrix resin fills the grooves, wherein widths of the grooves are less than widths of the second threads, and wherein the fiber-reinforced plastic is produced by the method according to claim 1.

9. The method of producing a fiber-reinforced plastic according to claim 1, wherein, in the plan view, the grooves are located outside of the weaving gaps of the base sheet.

10. The method of producing a fiber-reinforced plastic according to claim 1, wherein, in the plan view, each of the grooves is located outside of the weaving gaps of the base sheet.

11. The method of producing a fiber-reinforced plastic according to claim 1, wherein, in the plan view, each of the grooves is entirely located outside of the weaving gaps of the base sheet.

12. The method of producing a fiber-reinforced plastic according to claim 1, wherein the fiber fabric of the base sheet includes warp threads and weft threads, the weaving gaps being located between the warp threads and the weft threads such that, in the plan view, each of the grooves is entirely located outside of the warp threads and the weft threads.

13. The method of producing a fiber-reinforced plastic according to claim 1, wherein another surface of the transparent film, which opposes the surface of the transparent film, is flat.

14. The method of producing a fiber-reinforced plastic according to claim 1, wherein the transparent film includes through holes, in the plan view, the through holes being located outside of the weaving gaps.

15. The method of producing a fiber-reinforced plastic according to claim 1, wherein the first threads include warp threads and the second threads include weft threads.

16. The method of producing a fiber-reinforced plastic according to claim 1, wherein the widths of the grooves are less than widths of the second threads.

17. A method of producing a fiber-reinforced plastic, the method comprising:

disposing a transparent film in a molding die;

disposing a base sheet including a fiber fabric on the transparent film; and injecting a matrix resin into the molding die, wherein the fiber fabric includes first threads that are positioned substantially parallel to each other, second threads that intersect with the first threads, and weaving gaps that include gaps formed among the first threads and the second threads, wherein the weaving gaps include adjacent weaving gaps that are adjacent to each other, wherein the transparent film includes grooves on a surface facing the base sheet, wherein, in the disposing, in a plan view, the base sheet and the transparent sheet are positioned such that the grooves are sandwiched between the adjacent weaving gaps, and wherein widths of the grooves are less than distances between the adjacent weaving gaps.

\* \* \* \* \*